(12) United States Patent
Demers et al.

(10) Patent No.: US 7,746,476 B2
(45) Date of Patent: Jun. 29, 2010

(54) FIBER OPTIC GYROSCOPE

(75) Inventors: Joseph R. Demers, Glendale, CA (US); Ka Kha Wong, Alhambra, CA (US); Ronald T. Logan, Jr., Pasadena, CA (US)

(73) Assignee: Emcore Corporation, Albuquerque, NM (US)

( * ) Notice: Subject to any disclaimer, the term of this patent is extended or adjusted under 35 U.S.C. 154(b) by 448 days.

(21) Appl. No.: 11/776,452

(22) Filed: Jul. 11, 2007

(65) Prior Publication Data

US 2009/0015843 A1    Jan. 15, 2009

(51) Int. Cl.
*G01C 19/72*    (2006.01)
(52) U.S. Cl. ..................................... 356/462; 356/460
(58) Field of Classification Search .................. 356/460, 356/462, 466; 367/149
See application file for complete search history.

(56) References Cited

U.S. PATENT DOCUMENTS

| | | | | |
|---|---|---|---|---|
| 5,677,767 A * | 10/1997 | Shirasaki et al. | ............ | 356/460 |
| 6,034,924 A * | 3/2000 | Vakoc | ......................... | 367/149 |
| 6,278,657 B1 * | 8/2001 | Vakoc | ......................... | 367/149 |
| 6,377,391 B1 * | 4/2002 | Vakoc et al. | ............. | 359/337.1 |
| 6,466,364 B1 * | 10/2002 | Vakoc et al. | ............. | 359/337.1 |
| 6,529,444 B2 * | 3/2003 | Vakoc | ......................... | 367/149 |
| 6,667,935 B2 * | 12/2003 | Vakoc | ......................... | 367/149 |
| 6,678,211 B2 * | 1/2004 | Vakoc | ......................... | 367/149 |
| 2002/0097636 A1 * | 7/2002 | Vakoc | ......................... | 367/149 |
| 2002/0145795 A1 * | 10/2002 | Vakoc et al. | ............. | 359/337.4 |
| 2003/0043696 A1 * | 3/2003 | Vakoc | ......................... | 367/149 |
| 2003/0043697 A1 * | 3/2003 | Vakoc | ......................... | 367/149 |
| 2009/0015843 A1 * | 1/2009 | Demers et al. | ............. | 356/462 |

* cited by examiner

*Primary Examiner*—Patrick J Connolly

(57) ABSTRACT

A fiber optic gyroscope including an optical circulator in the path of said first and second beams for providing polarized first and second beams of identical polarization. A phase modulator couples the first and second beams to the first and second end respectively of the fiber loop, and couples for receiving the return first and second beams from the second and first ends respectively of the fiber loop. First and second photodiodes are coupled to the optical circulator for receiving the optical signal from the first and second return beams.

19 Claims, 5 Drawing Sheets

FIBER OPTIC GYROSCOPE

BACKGROUND OF THE INVENTION

1. Field of the Invention

The invention relates to fiber optic gyroscopes (FOGs) and in particular to integration techniques that utilize planar array technology to implement a FOG transceiver subassembly in a small, compact form factor.

2. Description of the Related Art

A FOG is a device that uses the propagation of light beams in an optical fiber coil to detect mechanical rotation of the fiber coil. The sensor is a coil of as much as 5 km of optical fiber. The typical implementation provides that two light beams be launched into the fiber in opposite directions. Due to an optical phenomena known as the Sagnac effect, the beam traveling against the rotation experiences a slightly shorter path than the other beam resulting in a relative phase shift. The amount of the phase shift of the original two beams can be measured by determining how the beams interfere with each other when they are combined. The intensity of the combined beam then depends on the rotation rate of the fiber coil about its axis.

A FOG provides extremely precise rotational rate information, in view of its lack of cross-axis sensitivity to vibration, acceleration, and shock. Unlike the classic spinning-mass gyroscope, the FOG has virtually no moving parts and no inertial resistance to movement. The FOG also provides a higher resolution than a ring laser gyroscope and is utilized in internal navigation systems requiring a high degree of accuracy.

There are two types of FOG systems, closed loop and open loop. In a closed loop system, a feedback path is defined so as to maintain the phase difference between the light beams constant after the beams exit the ends of the fiber coil. The amount of feedback needed to maintain the fixed phase relation is therefore indicative of the rate of rotation of the coil about its axis.

Open loop FOG systems calculate the rotation rate by way of amplitude measurements taken along an interference curve which results when the two exiting light beams are recombined.

Prior to the present invention there has not been a small, low cost fiber optic gyroscope in a highly integrated form factor.

SUMMARY OF THE INVENTION

1. Objects of the Invention.

It is an object of the present invention to provide a fiber optic gyroscope in a small, highly integrated form factor.

It is another object of the present invention to provide a multi-axis fiber optic gyroscope in a single integrated housing.

It is also another object of the present invention to provide a fiber optic gyroscope using multi-channel fiber optic planar array technology.

It is still another object of the present invention to provide a four-axis fiber optic gyroscope.

Additional objects, advantages, and novel features of the present invention will become apparent to those skilled in the art from this disclosure, including the following detailed description as well as by practice of the invention. While the invention is described below with reference to preferred embodiments, it should be understood that the invention is not limited thereto. Those of ordinary skill in the art having access to the teachings herein will recognize additional applications modifications and embodiments in other fields, which are within the scope of the invention as disclosed and claimed herein and with respect to which the invention could be of utility.

2. Features of the Invention.

Some implementations or embodiments may achieve fewer than all of the foregoing objects.

3. In another aspect of the invention, the present present provides (copy text of 15).

According to an embodiment, a fiber optic gyroscope comprises a light source for producing a beam of light, an optical circulator in the path of the beam for providing polarized primary and secondary beams of perpendicular polarization and a beam splitter in the path of one of the polarized beams to produce at least first, second, and third beams. The fiber optic gyroscope further comprises at least first, second, and third planar fiber loops each lying in a plane orthogonal to one another, and each having a first end and a second end, an optical interface coupling the first, second, and third beams to the first ends of each respective fiber loop, and for receiving the return first, second, and third beams from the second ends of each respective fiber loop, and a photodiode array coupled to the optical interface for receiving the optical signal from the first, second, and third return beams.

Some implementations or embodiments may incorporate or implement fewer of the aspects or features noted in the foregoing summaries.

BRIEF DESCRIPTION OF THE DRAWINGS

These and other features and advantages of this invention will be better understood and more fully appreciated by reference to the following detailed description when considered in conjunction with the accompanying drawings wherein.

Figure 1:
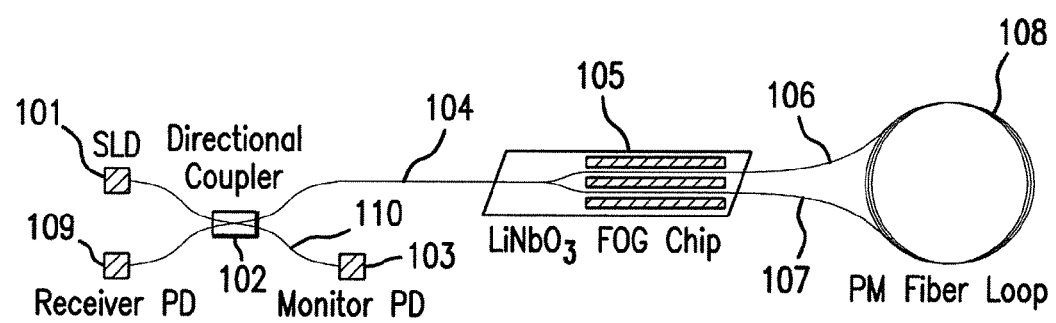
FIG. 1 is a highly simplified block diagram of a prior art single-axis fiber optic gyroscope.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENT

Details of the present invention will now be described, including exemplary aspects and embodiments thereof. Referring to the drawings and the following description, like reference numbers are used to identify like or functionally similar elements, and are intended to illustrate major features of exemplary embodiments in a highly simplified diagrammatic manner. Moreover, the drawings are not intended to depict every feature of actual embodiments or the relative dimensions of the depicted elements, and are not drawn to scale.

FIG. 1 depicts a highly simplified diagram of a single-axis Fiber Optic Gyroscope (FOG) transceiver subassembly as is known in the prior art. The diagram shows a fiber-coupled broadband source, e.g. a Super Luminescent Diode (SLD) 101 for producing a non-coherent beam of light, and a directional coupler 102 in the path of the beam. A lithium niobiate ($LiNbO_3$) phase modulator or FOG chip 105 is provided in a first path 104 from the output of the directional coupler, and a power monitoring photodiode 103 is provided in a second path 110 from the output of the directional coupler. A fiber loop or coil 108 with a fiber having a first 106 and second 107 end is coupled to the output of the phase modulator 105.

Light from the SLD 101 is split in the Y-junction of the phase modulator 105 and each path through the phase modulator is modulated before being applied to the first 106 and second 107 ends of the fiber loop 108 and counter-propagated through the coil. The optical signals then pass back through the phase modulator 105, are recombined in the Y-junction in the phase modulator and propagate back along path 104 to the directional coupler 102, whereby the return optical beam is then focused onto a receiving photodiode 109 where the intensity produces an electrical signal. The electrical signal is processed externally of the transceiver subassembly to compute the rotation rate of the coil 108 to provide inertial guidancy information.

Rotation in the plane of the fiber coil induces a change in the phase relationship of the two counter propagating beams, known as the Sagnac effect. The phase change may be measured as an intensity fluctuation on the receiving photodiode and further processing of the electrical signal may be used directly to determine the rotational rate of the coil. Since there is only one fiber loop and one plane, such measurement is a one-axis inertial measurement.

Figure 2:
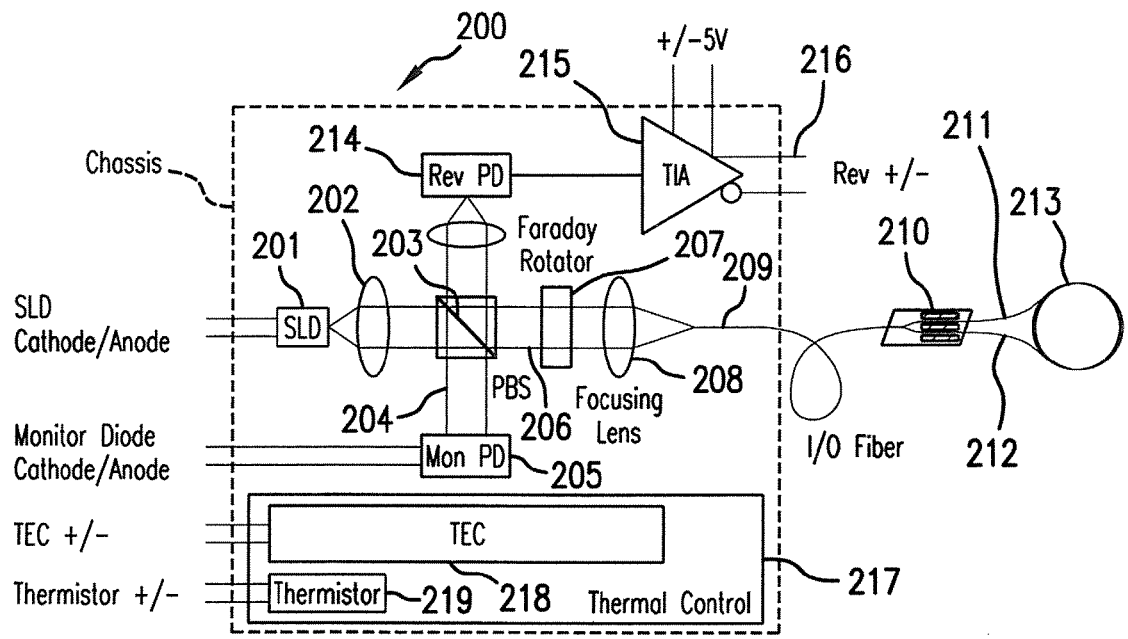
FIG. 2 is a detailed diagram of a prior art single-axis fiber optic gyroscope.

FIG. 2 depicts a more detailed block diagram of a prior art single axis FOG transceiver subassembly 200. In an effort to decrease cost, size, and parts count, the SLD 201, a collimating lens 202, an optical circulator (implemented with a Polarizing Beam-Splitter, or PBS, and a Faraday rotator 203), a receiver photodiode 214, and a Trans-Impedance Amplifier (TIA) 215 are integrated into an extremely small housing or form factor package 200. One such embodiment is a commercial product known as the FOG PB3010 transceiver module manufactured by Emcore Corporation in Alhambra, Calif.

Figure 3:
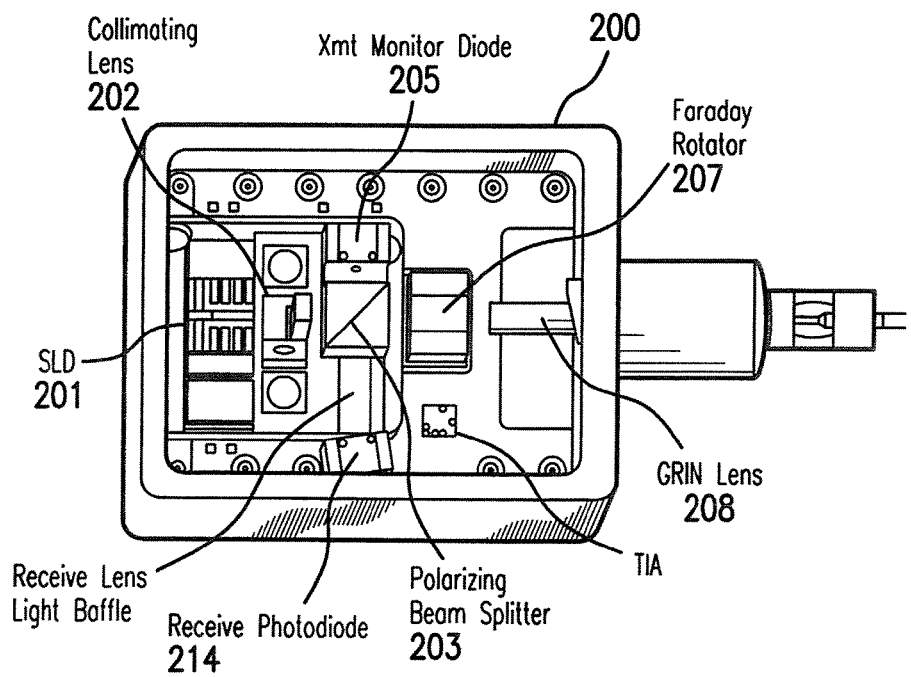
FIG. 3 is a top plan view of a prior art single-axis fiber optic gyroscope.

FIG. 3 is a top plan view of the prior art FOG shown in FIG. 2 with the lid of the housing removed to show the internal components. The Figure depicts the SLD 201, and a collimating lens 202 adjacent thereto. A Polarizing Beam-Splitter or PBS 203 is disposed in the path of the beam from lens 202, and the transmitter monitor photodiode 205 located on one side of the PBS 203, and the receiver photodiode 214 located on a printed circuit board on the other side of the PBS 203. A Trans-Impedance Amplifier (TIA) is also mounted on the printed circuit board, and is coupled to the photodiode 214 to produce the output electrical signal. The optical output beam of the PBS 203 is coupled through a Faraday rotator 207, which is in turn coupled to a GRIN lens 208 which couples to the I/O optical fiber extending from the housing 200.

In the device illustrated in FIGS. 2 and 3, 96% of the optical output from the SLD 201 is in the out-of-plane polarization (S polarization) while the remaining 4% is in the in-plane polarization (P polarization). The polarizing beam splitter 203 reflects the P polarization from the SLD 201 onto the power monitoring photodiode 205 but passes the S polarization. The light then passes through the Faraday rotator 207 unaltered and is coupled at 211 into the fiber 213 with a lens 208. From this point the S polarized light travels through the rest of the fiber loop 213 until it returns at the second end 212 in the same polarization state as when it left. When the light passes through the Faraday rotator 207 in this direction (i.e. back towards the SLD 201) the polarization is rotated into the P state. The polarizing beam splitter 203 then reflects the optical return signal onto the receiving photodiode 214 that produces an electrical output directly connected to an internal TIA 215 and provides a typical gain of 10,000.

Figure 4:
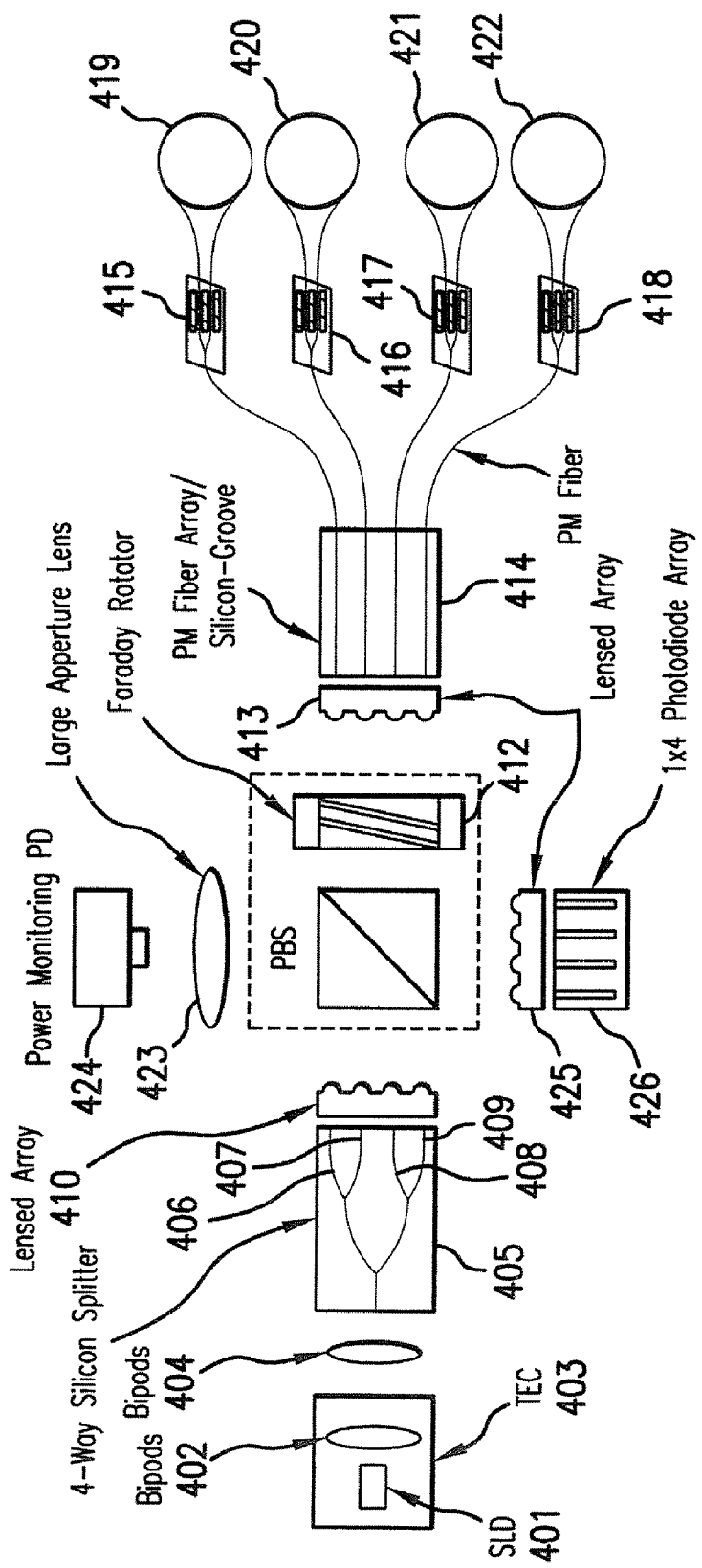
FIG. 4 is a block diagram of a four-axis hybrid fiber optic gyroscope according to the present invention in a first embodiment.

FIG. 4 is a highly simplified diagram of a four-axis FOG according to the present invention. One aspect of the present invention is to integrate at least three complete transceivers into a single package. The embodiment depicted in FIG. 4 illustrates the integration of four transceivers in a single packaged unit, which provides redundancy and greater reliability. Integration of a multi-axis $LiNbO_3$ phase modulator is also desirable, and is depicted in the embodiment of FIG. 6, but because of difficulties with radiative modes from the Y-junction, is not as straightforward as the other components. The present invention may implement a multi-axis FOG transceiver in embodiments with or without the integrated $LiNbO_3$ phase modulator as depicted in alternative embodiments FIGS. 4, 5 and 6 respectively.

FIG. 4 depicts the SLD 401, bipod mounted collimating (insert see e.g. the lenses described in U.S. Pat. No. 7,126,078) lenses 402 and 404. The components 401 and 402 are mounted on a thermoelectric cooler (TEC) 403. The output beam from lens 404 is coupled to a 4-way silicon waveguide splitter 405, which splits the beam into four beams propagated along waveguides 406, 407, 408 and 409.

One feature of the present invention relies on the use of fiber optic planar array technology that was developed primarily for fiber optic switching applications. In the present invention, the devices that are utilized to build a hybrid integrated four axis FOG transceiver include: a 1×4 silica/silicon waveguide splitter 405; a 1×4 fiber V-groove assembly 414; a 1×4 lens array 410, 413 and 425; and a 1×4 photodiode array 426.

The 1×4 silica/silicon waveguide splitters 405 are commercial-off-the-shelf devices that are produced by employing dopants to implement equal power splitting light waveguides or channels in the surface of a silicon wafer. Coupling light into the input waveguide will result in approximately 25% of the power in each of the four output waveguides 406, 407, 408 and 409. The output waveguides are typically spaced at 0.25 mm intervals with an accuracy that is better than 0.00025 mm.

A fiber optic planar array 414 disposed adjacent the lensed array 413 preferably consists of four discrete optical fibers mounted in V-groove blocks at consistent or uniform intervals. Generally, the fiber pitch spacing is 0.25 mm and the core accuracy is ±0.0005 mm. The planar array V-groove blocks are currently commercially available from several suppliers with the fibers already mounted, aligned and polished.

The final high accuracy component required for this design are the lens arrays 410, 413 and 425 that have matching fiber pitch and are specifically designed to couple collimated light into the fiber array.

The 1×4 photodiode array 426 is not a standard commercial item. However, the specifications of the device are not critical and may be a relatively low accuracy, and thus may be easily fabricated with existing technology. The chosen embodiment of this design is a four-axis implementation primarily due to the wide commercial availability of 4 channel splitters 405 and V-groove planar array. The concept of a four-axis unit enables an inherent redundancy and reliability, allowing a failure to take place in a single PD or coil, without adversely compromising performance or the size of the overall assembly.

With these components, one can produce a free space workspace for hybrid integration through which four parallel, collimated optical beams pass. A significant decrease in parts count is then achievable by using only a single optical circulator and a single high power SLD, as illustrated in FIG. 4.

Some additional features or aspects to note about the design according to the present invention are as follows:

The array spacing is only 0.25 mm and the PBS may utilize the 2 mm device that is employed in the current version of the PB 3010 (see FIG. 3).

The lens arrays should be glued to their respective waveguides, but the waveguide system is symmetric. This means that the bond line of the lens arrays is the same and should be on the order of 0.010 mm for a properly designed lens. The tolerance on a typical fiber coupling is approximately 1 dB per 1 micron. While this is a tight tolerance, employing a UV cure adhesive with properly balanced illumination will meet such specifications.

The four beams which correspond to the four axes of the FOG are separate, collimated beams and therefore will not cross couple.

The waveguides must be flat relative to each other. This means that the substrate must be extremely flat and the glue that bonds them must not have any wedge.

The large aperture lens is not actually required since it is only necessary to monitor one of the four beams in order to measure the output power of the SLD.

Figure 5:
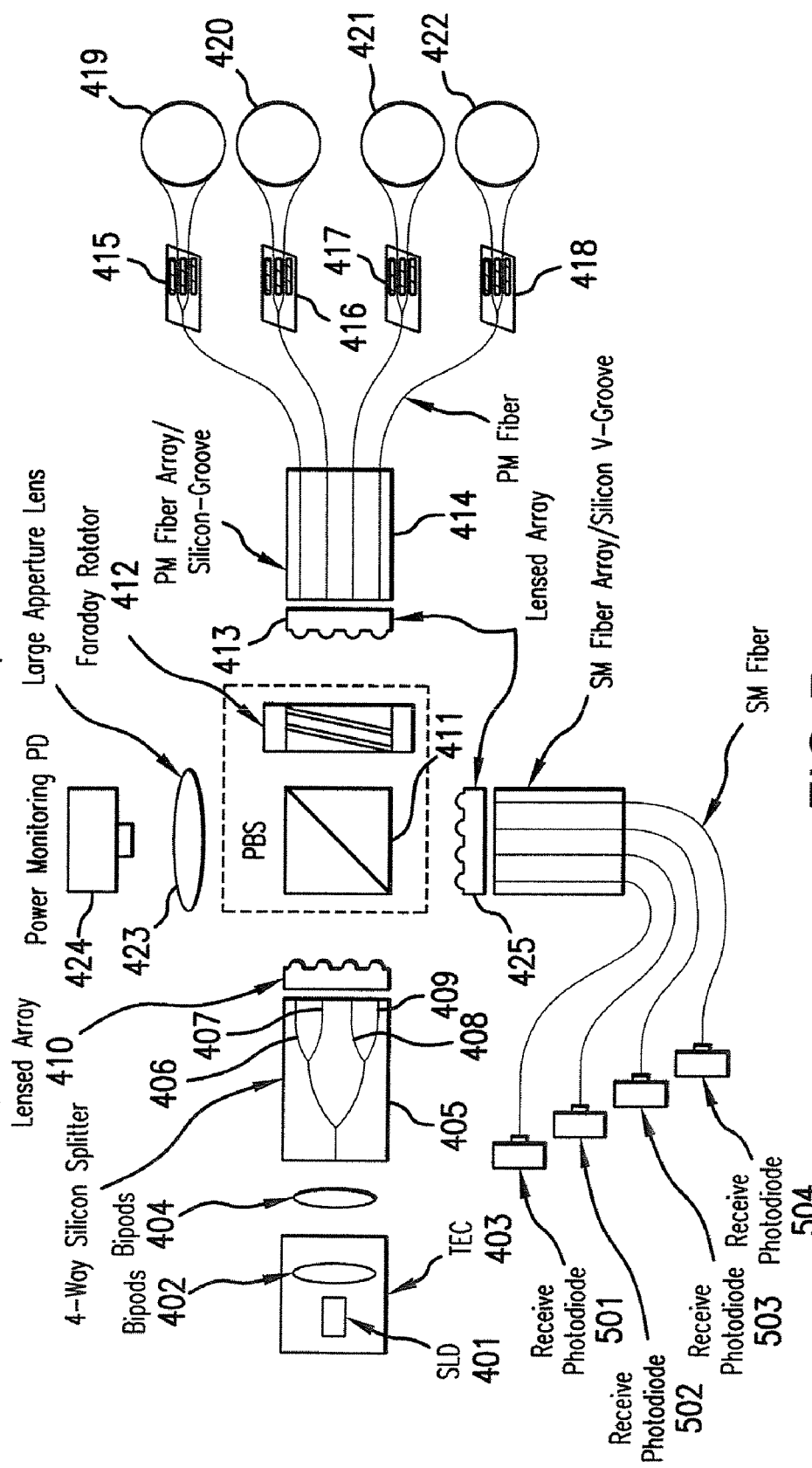
FIG. 5 is a diagram of a four-axis hybrid fiber optic gyroscope according to the present invention in a second embodiment employing fiber as a spatial filter on the receiver photodiodes.
Figure 6:
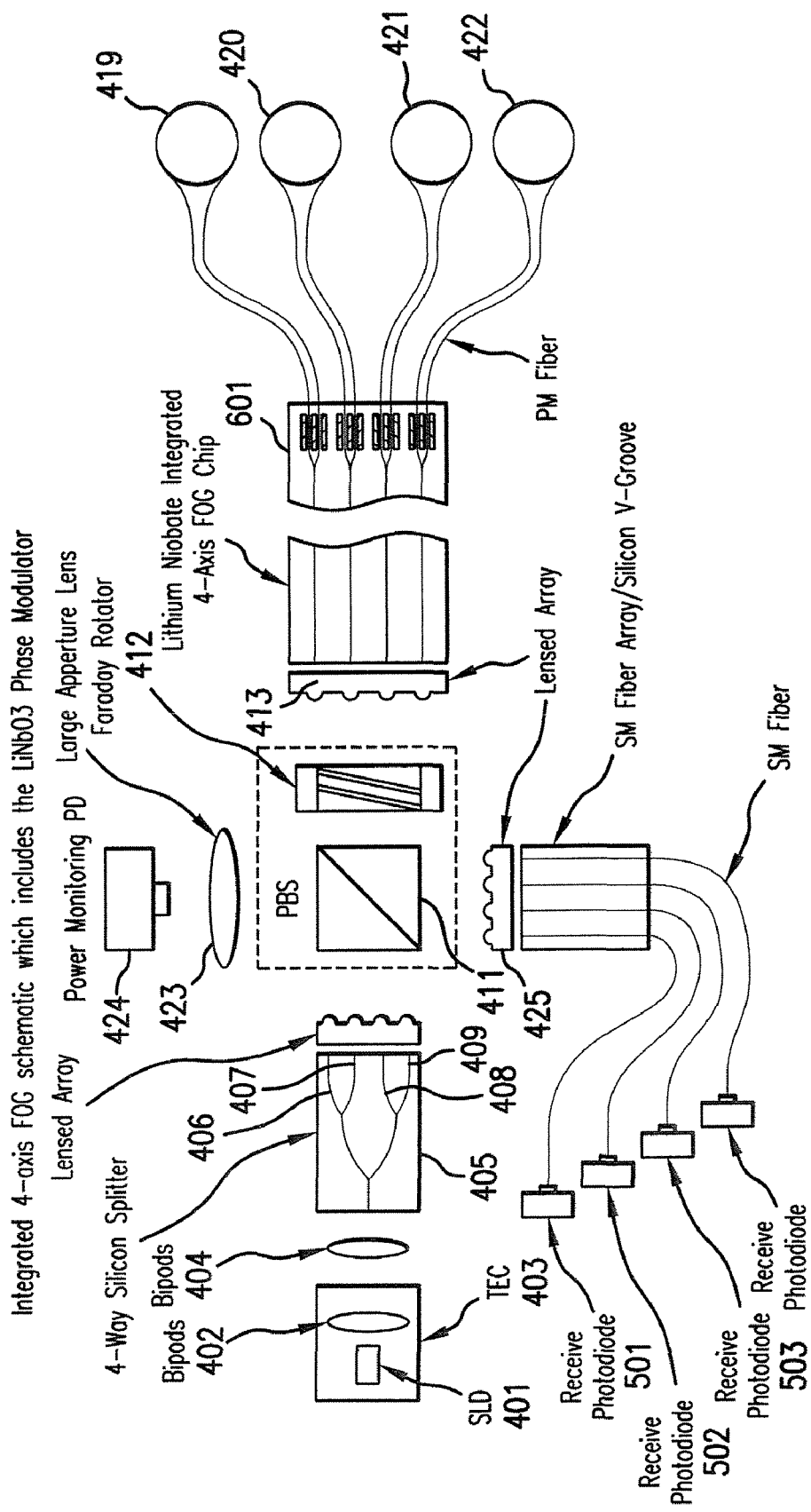
FIG. 6 is a diagram of a four-axis hybrid fiber optic gyroscope according to the present invention in the second embodiment including a single LiNbO$_3$ phase modulator.

If a higher resolution between the axes is required than what is achievable with this design, then the photodiode array may be replaced with a 1×4 Single Mode (SM) fiber array as depicted in the embodiment shown in FIG. 5.

In this second embodiment, each fiber terminates in a separate photodiode, 501, 502, 503 and 504 respectively. The fiber acts as a spatial filter of the optical signal, which is particularly important for the more highly integrated concept that also incorporates a $LiNbO_3$ phase modulator (as illustrated in the embodiment depicted in FIG. 6). This implementation may be required to resolve a known issue with $LiNbO_3$ phase modulator chips, the existence of complementary modes. These are non-guided modes which are produced by the interference at the Y-junctions of the phase modulator and have K vectors which, while they are not the same as the guided modes, are close enough that they typically impinge on non-spatially filtered photodiodes, causing a wavelength and position dependent bias error.

FIG. 6 depicts a four-axis hybrid FOG according to the present invention, similar to the embodiment of FIG. 5, but in which the four discrete $LiNbO_3$ phase modulators have been replaced by a single integrated modulator 601.

The highly integrated, multi-axis FOG transceiver, with or without the integrated $LiNbO_3$ phase modulator 601, represents an important development in the field of hybrid optical integration.

Various modifications and improvements of the present invention may also be apparent to those of ordinary skill in the art. Thus, the particular combination of parts described and illustrated herein is intended to represent only certain embodiments of the present invention, and is not intended to serve as limitations of alternate devices within the spirit and scope of the invention.

It will be understood that each of the elements described above, or two or more together, also may find a useful application in other types of constructions differing from the types of constructions described above.

While the invention has been illustrated and described as embodied in a fiber optic gyroscope, it is not intended to be limited to the details shown, since various modifications and structural changes may be made without departing in any way from the spirit of the present invention.

Without further analysis, from the foregoing others can, by applying current knowledge, readily adapt the present invention for various applications. Such adaptations should and are intended to be comprehended within the meaning and range of equivalence of the following claims.

What is claimed is:

1. A fiber optic gyroscope comprising:
   a non-coherent light source for producing a beam of light;
   a first beam splitter in the path of said beam to produce first and second beams;
   an optical circulator in the path of said first and second beams for providing polarized third and fourth beams respectively, with polarization orthogonal to each other;
   a second beam splitter in the path of said third beam for producing fifth and sixth beams;
   first and second planar optical fiber loops each having a first end and a second end;
   a phase modulator coupling said fifth and sixth beams to said first and said second ends of said first and second optical fiber loops respectively, and receiving the return fifth and sixth beams from said second and said first ends respectively of said fiber loops; and
   first and second photodiodes coupled to said optical circulator for receiving the optical signal from said fifth and sixth return beams.

2. A gyroscope as defined in claim 1, wherein said first beam splitter is a four-way silicon splitter.

3. A gyroscope as defined in claim 1, wherein said optical circulator includes a polarizing beam splitter.

4. A gyroscope as defined in claim 3, wherein said optical circulator further comprises a Faraday rotator coupled to an output of the polarizing beam splitter.

5. A gyroscope as defined in claim 4, wherein said polarizing beam splitter directs the P polarization of the initial beam of light from the incoherent source onto a power monitoring photodiode.

6. A gyroscope as defined in claim 5, wherein said polarizing beam splitter directs the S polarization of the initial beam of light from the incoherent source through and into the Faraday rotator.

7. A gyroscope as defined in claim 4, wherein said polarizing beam splitter directs the return light of P polarization to said first and second photodiodes.

8. A gyroscope as defined in claim 3, wherein said optical circulator includes a Faraday rotator, and wherein the polarizing beam splitter couples the light of S polarization to the Faraday rotator.

9. A gyroscope as defined in claim 4, further comprising a monitor photodiode coupled to the polarizing beam splitter for monitoring the light of P polarization from the light source.

10. A gyroscope as defined in claim 1, wherein said first and second photodiodes are assembled on a 1×4 photodiode array.

11. A gyroscope as defined in claim 1, wherein said second beam splitter is embedded in a lithium niobate FOG chip.

12. A gyroscope as defined in claim 7, wherein said polarizing beam splitter directs the return light of P polarization from the optical fiber loop to said 1×4 photodiode array.

13. A gyroscope as defined in claim 3, further comprising a 1×4 V-groove assembly and a phase modulator for coupling the Faraday rotator with the optical fiber loop.

14. A gyroscope as defined in claim 9, further comprising a lens array coupling the Faraday rotator with the 1×4 fiber V-groove assembly.

15. A fiber optic gyroscope comprising:

a light source for producing a beam of light;

an optical circulator in the path of said beam for providing polarized primary and secondary beams of perpendicular polarization;

a beam splitter in the path of one of said polarized beams to produce at least first, second, and third beams;

at least first, second, and third planar fiber loops each lying in a plane orthogonal to one another, and each having a first end and a second end;

an optical interface coupling said first, second, and third beams to said first ends of each respective fiber loop, and for receiving the return first, second, and third beams from said second ends of each respective fiber loop; and a photodiode array coupled to said optical interface for receiving the optical signal from said first, second, and third return beams.

16. A gyroscope as defined in claim 15, wherein said beam splitter is a four-way silicon splitter.

17. A gyroscope as defined in claim 15, wherein said optical circulator includes a Faraday rotator.

18. A gyroscope as defined in claim 15, wherein said optical circulator includes a polarizing beam splitter.

19. A gyroscope as defined in claim 15, further comprising a fourth planar fiber loop lying in a plane different from the planes of said first, second and third planar fiber loops.

* * * * *